Nov. 29, 1960  E. M. STRYKER, JR., ET AL  2,962,664
PULSE-FORMING CIRCUIT
Filed Feb. 19, 1957
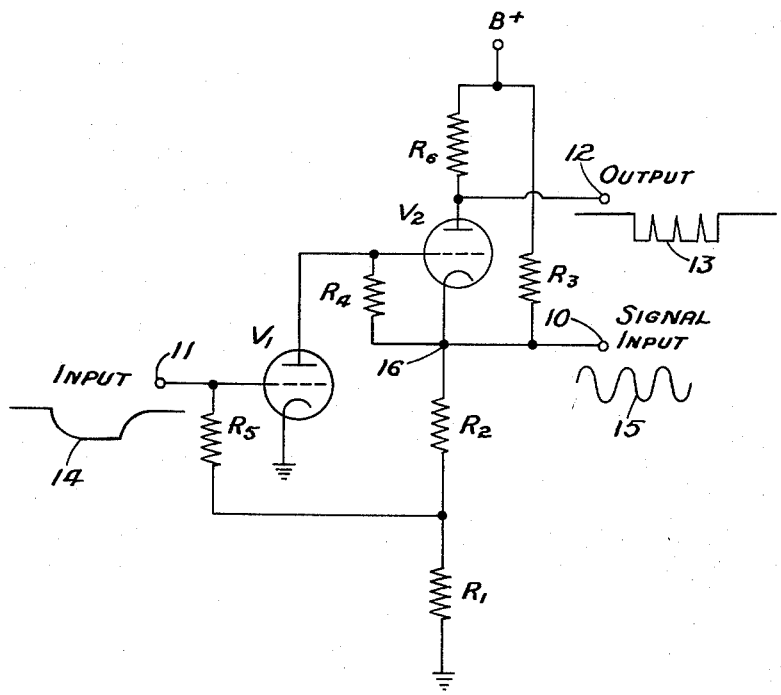
INVENTORS
EDWIN M. STRYKER JR.
ELMER C. THULIN
BY
ATTORNEYS

United States Patent Office 2,962,664
Patented Nov. 29, 1960

2,962,664

PULSE-FORMING CIRCUIT

Edwin M. Stryker, Jr., Marion, and Elmer Charles Thulin, Cedar Rapids, Iowa

Filed Feb. 19, 1957, Ser. No. 641,146

3 Claims. (Cl. 328—156)

This invention relates generally to pulse-forming circuits which provide gated groups of pulses that are formed as serrations in base pulses.

Oftentimes, it is necessary to provide a sequence of pulses, wherein each pulse has imposed upon it other pulses having a higher-repetition rate, which are carried as serrations in the former pulses. An example of such serrated pulses is the vertical synchronization pulses used in television, which are serrated at the horizontal synchronization pulse rate. Another use of such serrated pulses is in the gated selection of pulses, wherein groups of pulses are selected by being provided as serrations in longer base pulses that encompass the groups of selected pulses.

It is, therefore, an object of this invention to provide a circuit of very simple construction, which can form serrated pulses.

It is another object of this invention to provide a circuit that can form serrated pulses from imperfectly-formed square-wave pulses having group duration, and a sine wave having a frequency equal to the repetition rate of the serrations.

Further objects, features and advantages of this invention will be apparent to a person skilled in the art upon further study of the specification and the single figure, which is a schematic of a form of the invention.

A pair of tubes $V_1$ and $V_2$, which can be halves of a dual-triode tube, are provided.

Now referring to the figure, a terminal 10 is connected to a source (not shown) providing a continuous wave 15. Also, a terminal 11 is connected to a source of negative pulses 14 (not shown). Pulses 14 are of the square-wave type but may be poorly formed with rounded leading and trailing edges.

Terminal 10 is connected to the cathode of tube $V_2$; and terminal 11 is connected to the grid of tube $V_1$. The cathode of $V_1$ is grounded.

A voltage-divider network comprising resistors $R_1$, $R_2$ and $R_3$ is connected serially between ground and the B plus source. The cathode of tube $V_2$ is connected to point 16 on the voltage divider.

The grid of tube $V_2$ is connected to the plate of tube $V_1$. A resistor $R_4$ is connected between the plate of tube $V_1$ and point 16. Thus, resistor $R_4$ acts as both the plate resistor of tube $V_1$ and the grid-leak resistor of tube $V_2$.

The plate of tube $V_2$ is connected through another resistor $R_6$ to the B plus source. An output terminal 12 is connected to the plate of tube $V_2$ to receive the voltage pulses formed by the invention.

The voltage-divider sets the direct-current levels for tubes $V_1$ and $V_2$. Consequently, tube $V_1$ normally conducts, since its grid and plate are normally at positive potentials with respect to its cathode. However, tube $V_2$ normally is non-conducting because the plate current of tube $V_1$ passing through resistor $R_4$ biases tube $V_2$ below cutoff.

The sine-wave input provided at terminal 10 is continuously received at the grid of tube $V_1$. Normally, the sine wave does not disturb the operation of tube $V_1$ because the positive peaks merely maintain the conduction of tube $V_1$ and the negative peaks are insufficient to stop conduction. On the other hand, the sine-wave input does not affect the normal state of tube $V_2$ because the wave is applied simultaneously to its grid and cathode.

When input pulses 14 are applied, the negative swing of each pulse 14 drives the grid of tube $V_1$ below cutoff for its duration. While tube $V_1$ is cut off, its plate current through resistor $R_4$ ceases; and tube $V_2$ then conducts. While tube $V_1$ is cut off during a negative pulse 14, the positive peaks of sine wave 15, received on the grid of tube $V_1$, drive it into momentary instances of conduction. These momentary conductions appear as short pulses of current through resistor $R_4$ to momentarily drive tube $V_2$ into non-conduction during its period of each current pulse. Hence, plate current passes through tube $V_2$ only while a negative pulse is being received by tube $V_1$, and their plate current is interrupted at the rate of the sine wave frequency. When this plate current passes through plate resistor $R_6$ of tube $V_2$, serrated output voltage pulses are sensed at output terminal 12.

The amplification of tubes $V_1$ and $V_2$ combined with the clipping action provided by their cutoff levels enables the output pulse to be well shaped with sharp edges and serrations.

Although this invention has been described with respect to particular embodiments thereof, it is not to be so limited as changes and modifications may be made therein which are within the full intended scope of the invention as defined by the appended claims.

We claim:

1. A circuit for forming serrated pulses comprising a pair of electron-control means, each having at least one control electrode with first and second terminal electrodes, a source of negative pulses connected to the control electrode of said first electron-control means and its first terminal electrode connected to ground, the control electrode of said second control means being connected to the second terminal electrode of said first electron-control means, a voltage divider comprising a plurality of resistors connected between ground and a direct voltage source, the first terminal electrode of said second electron-control means being connected to a point of said voltage divider, and another resistor means connected between the control and first terminal electrodes of said second electron-control means, further resistor means connected between the direct-voltage source and the second terminal electrode of said second electron-control means, grid-leak resistor means connected between the control electrode of said first electron means and a point of lower potential on said voltage divider, a wave source having a frequency greater than the repetition rate of said input pulses, and said wave source being connected to said voltage divider.

2. A circuit for forming serrated pulses from a wave source, and a source of negative pulses, comprising first and second electron tubes, each having at least a cathode, grid and plate, a voltage divider connected between ground and a B plus voltage supply, said first tube having its cathode connected to ground, and said second tube having its cathode connected to a point on said voltage divider, first resistance means connected between the plate of said first tube and said divider, second resistance means connected between the grid of said first tube and a place on said voltage divider, the grid of said second tube connected to the plate of said first tube, third resistance means connected between the plate of said second tube and said B plus source, said source of negative pulses being connected to the grid of said first tube, and said wave source being connected to said voltage divider, with the serrated pulses being taken from the plate of said second tube.

3. A circuit for forming serrated pulses from a source of negative pulses and a wave source having a frequency greater than the repetition rate of said negative pulses, comprising first and second electron tubes, each having at least a control grid, a voltage divider including first, second and third resistors connected between ground and a B plus voltage supply, the cathode of said first tube connected to ground, and the cathode of said second tube connected to a point on said voltage divider between said second and third resistors, a fourth resistor connected between the cathode and grid of said second tube, the grid of said second tube connected to the plate of said first tube, a fifth resistor connected between the grid of said first tube and a point on said voltage divider between said first and second resistors, a sixth resistor connected between the B plus supply and the plate of said second tube, said source of negative pulses being connected to the grid of said first tube, and said wave source being connected to the cathode of said second tube, whereby the serrated output pulses are provided from the plate of said second tube.

References Cited in the file of this patent

UNITED STATES PATENTS

| | | |
|---|---|---|
| 2,504,348 | Peterson | Apr. 18, 1950 |
| 2,570,225 | Felker | Oct. 9, 1951 |
| 2,576,552 | Wittenberg | Nov. 27, 1951 |
| 2,671,169 | Norton | Mar. 2, 1954 |